(12) United States Patent
Pham

(10) Patent No.: US 11,509,451 B1
(45) Date of Patent: Nov. 22, 2022

(54) SYSTEMS AND METHODS OF RESILIENT CLOCK SYNCHRONIZATION IN PRESENCE OF FAULTS

(71) Applicant: Government of the United States as represented by the Secretary of the Air Force, Wright-Patterson AFB, OH (US)

(72) Inventor: Khanh Pham, Albuquerque, NM (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 30 days.

(21) Appl. No.: 17/185,110

(22) Filed: Feb. 25, 2021

Related U.S. Application Data

(60) Provisional application No. 62/982,889, filed on Feb. 28, 2020.

(51) Int. Cl.
   *H04W 40/00* (2009.01)
   *H04L 7/033* (2006.01)

(52) U.S. Cl.
   CPC .................................. *H04L 7/0331* (2013.01)

(58) Field of Classification Search
   CPC ... H04L 7/0331; H04L 7/0337; H04L 7/0338; H04L 7/00
   See application file for complete search history.

(56) References Cited

U.S. PATENT DOCUMENTS

2010/0254311 A1* 10/2010 Simeone .................... H03L 7/08 370/328

OTHER PUBLICATIONS

K. D. Pham, "Resilient Synchronization of Radio Networks of Clocks: A Pursuit-Evasion Graphical Game Approach," IEEE Aerospace Conference, Big Sky, MT, 2019.
"Resilient Synchronization of Radio Networks of Clocks: A Pursuit-Evasion Graphical Game Approach", Invited Presentations, the Washington DC and Northern Virginia Chapter, Arlington, VA, Feb. 13, 2018.
K. D. Pham, "Resilient Synchronization of Radio Networks of Clocks: A Pursuit-Evasion Graphical Game Approach," EEE Aerospace Conference, Big Sky, MT, 2019.
K. D. Pham, "Coordination and Consensus over Networks: A Risk-Averse Protocol," IFAC Networked & Autonomous Air and Space Systems, Santa Fe, NM, 2018.
K. D. Pham, "Resilient Synchronization of Radio Networks of Clocks: A Pursuit-Evasion Graphical Game Approach", Invited Presentations, the Washington DC and Northern Virginia Chapter, Arlington, VA, Feb. 13, 2018.

61588-2009—IEC/IEEE International Standard—Precision Clock Synchronization Protocol for Networked Measuremenl and Control Systems.
E. Lisove et al., "Game theory applied to secure clock synchronization with IEEE 1588," 2016 IEEE International Symposium on Precision Clock Synchronization for Measurement, Control, and Communication (ISPCS), Sep. 4-9, 2016.
G. Giorgi et al., "Performance Analysis of Kalman-Filter-Based Clock Synchronization in IEEE 1588 Networks," IEEE Transactions on Instrumentation and Measurement (vol. 60, Issue: 8, Aug. 2011) pp. 2902-2909 Date of Publication: Jun. 27, 2011.
H. Song et al., "Attack-resilient time synchoronization for wireless sensor network," Ad Hoc Networks, vol. 5/Iss. 1 (2007) 112-125.
K. Sun et al., "Secure and resilient clock synchronization in wireless sensor networks," IEEE J. Selected Areas of Comm., vol. 24/Iss 2 (2006) 395-408.
R. Tan et al., "Resilience Bounds of Sensing-Based network Clock Synchronization," 2018 2018 IEEE 24th International Conference on Parallel and Distributed Systems (ICPADS), Dec. 11-13, 2018.
K. F. Hasan et al., "Time synchronization in vehicular ad-hoc networks: A survey on theory and practice." Vehicular Comm., vol. 14 (2018) 39-51.
L. Han et al., "A dstributed time synchronization solution without satellite time reference for mobile communications," IEEE Comm Lett, vol. 17/Iss. 7 (2013) 1447-1450.
B. Wang et al., "Precise and continuous time and frequency synchronization at the 5x10A-19 accuracy level," Scientific Reports 2, 556 (2012).
K. G. Shin et al., Clock synchronization of a large multiprocessor system in the presence of malicious faults, IEEE Transactions on Computers, vol. C36/Iss. 1 (1987) 2-12.
Y. Kikuya et al., "Resilient clock synchronization over unreliable channels in WSNs," 2017 IEEE 56th Annual Conference on Decision and Control (CDC), Dec. 12-15, 2017.
L. Lamport et al., "Synchronizing clocks in the presence of faults," J. Assoc. Comput. Machinery, vol. 32/Iss. 1 (1985)52-78.
J. Bund et al., "Fault tolerant gradient clock synchronization," PODC '19: Proceedings of the 2019 ACM Symposium an Principles of Distributed Computing Jul. 2019 pp. 357-365.
Meinberg, "Time Synchoronization in Telecom Networks," available at https://www.meinbergglobal.com/english/info/time-synchronization-telecom-networks.htm, published at least by Mar. 19, 2015, accessed Jul. 6, 2022.

* cited by examiner

*Primary Examiner* — Jamal Javaid
(74) *Attorney, Agent, or Firm* — AFMCLO/JAZ; Chastity D. S. Whitaker

(57) ABSTRACT

The present disclosure provides an analytical framework to investigate judicious topology reweighting of radio networks of clocks, when distributed time transfer and synchronization are based on physical layers and subject to the presence of false timing signals. Protagonist clocks exchange timing information pairwise, which is modeled as clocks tending to follow the majority of their neighbors. Antagonist clocks inject false timing signals, thereby, influencing the timing synchronization of (some of) the other protagonist clocks they meet. A class of pursuit-evasion graphical games subject to complete state observations and exploitation of phase noise disturbances, is proposed in designing clock steering protocols for resilient time metrologies that will be immune to erroneous timing signals injected into remote time dissemination networks.

1 Claim, No Drawings

SYSTEMS AND METHODS OF RESILIENT CLOCK SYNCHRONIZATION IN PRESENCE OF FAULTS

CROSS-REFERENCE TO RELATED APPLICATIONS

This application claims the benefit of priority under 35 U.S.C. § 119(e) to U.S. Provisional Application Ser. No. 62/982,889 entitled "Resilient Synchronization of Radio Networks of Clocks," filed 28-Feb.-2020, the contents of which are incorporated herein by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

TECHNICAL FIELD

The present disclosure generally relates to

BACKGROUND

The progress of high precise and accurate time transfer over large distances is closely related to the development of satellite communication technology. Both inter-satellite and terrestrial-satellite time transfer and synchronization rely on the underlying specific concepts of operations. Thus, the state-of-the-art tools for time transfer analysis and the methods for synchronization are generally accustomed and tailored approaches to a small number of problems of interest, Much of network effects pertaining to large-scale clock steering operations, energy efficiency, and robust, performance for mutual synchronization are largely missing, let alone in potential denied environments of having persistent and competing timing faults and misinformation spreads. Concerning larger networks with multiple constellations of timescales, it will likely be necessary to have more analytical frameworks and design principles not only to balance between total energy consumption, network stability, and time convergence but also to tolerate churns, due to clocks joining or leaving the network.

DETAILED DESCRIPTION

The present disclosure provides an analytical framework to investigate judicious topology reweighting of radio networks of clocks, when distributed time transfer and synchronization are based on physical layers and subject to the presence of false timing signals. Protagonist clocks exchange timing information pairwise, which is modeled as clocks tending to follow the majority of their neighbors. Antagonist clocks inject false timing signals, thereby, influencing the timing synchronization of (some of) the other protagonist clocks they meet. A class of pursuit-evasion graphical games subject to complete state observations and exploitation of phase noise disturbances, is proposed in designing clock steering protocols for resilient time metrologies that will be immune to erroneous timing signals injected into remote time dissemination networks.

Distributed synchronization in wireless communications is being subject to a growing diversity of threats, in part due to the pervasive integration of device-to-device communications, ad-hoc, and internet of things. Potential threats, whether deliberate or not, may have wide impacts on systematic biases and/or spread of misinformation across time difference of measurement data by multiple sensors [1], carrier and phase synchronization of distributed beamforming and space-time coding [2] and [3]. Adaptive control-theoretic approaches and resilience mechanisms are promising for circumvent threat impacts in networked multi-agent systems. Indeed, much work is underway in securing cyber-physical systems and networks [4]-[6].

In the context of packet and physical-layer based timing synchronization [7]-[11], information about the mutual timing synchronization is dispersed but can be easily misled by non-cooperative timing sources for various rational or irrational reasons. The main contribution of the work is to develop mathematical fundamentals and theoretical core technology for a proof-of-concept, in which multi-agent pursuit-evasion games have multiple protagonist and antagonist clocks competitively interacting on communications networks. An immediate application of the results here could be on the deployment of clock and timescale adjustments to enable resilient time metrologies despite of some clocks intentionally or unintentionally operate in disruptive manners.

This work is related to a large and growing multi-agent graphical game literature [12]-[13].Most of the previous works focus on protagonist and antagonist interactions among agents networked by communications graphs and computational complexity dependent only on local neighborhoods. None of the findings as previously stated, considers distributed topology designs towards aggregation of information and spread of misinformation influenced by re-weighting of network edges, which may be conceived as realistic implementations to dampen the spread of misinformation and balance edge weights for aggregation of information. Relative to these efforts, this study introduces transmitting signal powers received as dynamic selections of interconnection (edge) weights, proposes random transmit selection to address concerns of total energy efficiency and network scalability, and gives insights into new conceptual tools such as discrete-time linear-quadratic dynamic games for characterizing timing synchronization in the presence of antagonist interactions.

The Concept of a Radio Clock Network: A graphical game framework that allows formal modeling of adversarial behavior on networks of radio-limited clocks separated by large distances, is investigated. Each clock is regarded as an agent interchangeably, who has an attitude state with a certain degree of cooperation or defection. For instance, pursuit-evasion graphical games consider two opposing teams of networked agents; e.g., one Evader team E of protagonist agents that exchange clock pulses, thereby, leading to the formation of more accurate timing beliefs, and one Pursuer team P of antagonist agents that work together for spread of misinformation about timing.

Protagonist and Antagonist Graphs: For a systematic analysis, FIG. 1 illustrates the basic concept for the radio clock network. Furthermore, enabled through the use of time-varying communications graphs, such shared timing information can be made feasible. There are $N^X$ clocks in each team X and X=E, P. Each clock has its own independently operated local oscillator (LO) using an identical loop filter, $\varepsilon^X(z)\varepsilon^X$ together with different free-oscillation frequencies $$\left\{\frac{1}{T_k^X}\right\}_{k=1}^{N^X}$$

arising from random frequency offsets around a nominal value.

Timing pulse exchange between clocks or agents are resulted from bilateral communications enabled by a sequence of weighted undirected graphs $\mathcal{G}^X(n)(\mathcal{V}^X, \mathcal{A}^X(n), w^X(n))$ with a common vertex set $\mathcal{V}^X=\{1,\ldots,N^X\}$, a subset of $\mathcal{V}^X \times \mathcal{V}^X$ satisfying $(k,k) \in \mathcal{A}^X(n)$ for all $k \in \mathcal{V}^X$, and the map $w^X: \mathcal{A}^X \times N \mapsto R_+$ (the nonegative real line) associating to each arc $(k,l)$ of $\mathcal{A}^X(n)$ a strictly positive weight $w_{kl}^X(n)$. Each synchronization cycle $n \in N$ is assumed to be larger than radio propagation and signal processing delays, which is necessary for preparation of the clock state transmission, interrogation by the LO measurements, and correction of the LO according to the measurement feedback.

Random Transmission, Local Views, and Coupling Factor: A central question for distributed pulse-coupled synchronization is to understand potential tradeoff between total energy consumption versus the synchronization locking time under the sequence of communication graphs $(\mathcal{V}^X, \mathcal{A}^X(n))$ and $X=E, P$. A first step towards developing and analyzing a framework for providing answers to this question is to consider a random transmit selection, with which the clock $k$ and $k \in \mathcal{V}^X$ randomly decides transmitting a timing pulse at its local time $t_k^X(n)$, and thereby, is postulated as a random variable for any given feedback cycle $n \in N$ $$Prob^X(x) = \begin{cases} 1 - \beta_k^X & x = Tx \text{ mode} \\ \beta_k^X & x = Rx \text{ mode} \end{cases} \quad (1)$$

where $0 < \beta_l^X < 1$ and $X=E, P$ denotes the selection factor and thus, defined as the probability that the clock or agent $k$ is in the reception mode of its pulse signals. To prevent the clock from being unstable, an immediate need is to assign a rest period right after the pulsing of a signal, where the radio receiver of clock or agent $k$ is shut off and all the timing signals arriving within this period are ignored.

Though this is a convention, since as stated above, a random indicator at the period $n \in N$ characterizing random transmit selection by the agent $k$, is given by $$I_k^X(n) \begin{cases} 0 & \text{with probability } 1 - \beta_k^X \\ 1 & \text{with probability } \beta_k^X. \end{cases} \quad (2)$$

Apart from the random transmit selection according to its indicator $I_k^X(n)$, it is necessary to maintain knowledge of dispersed timing information, through which local clock neighbors of the clock $k$ transmitting signal pulses; e.g., $$T_n^X(n) \begin{cases} 1 & \text{if } I_k^X(n) = 0 \\ 0 & \text{if } I_k^X(n) = 1. \end{cases} \quad (3)$$

In addition, larger views have a strong effect, in terms of reduction of synchronization errors. At the clock feedback cycle $n$, the interaction by the agent $k$ with its neighbors can perturb the periodic pattern of its state function as it is explained in the view size; or equivalently, the set Neighbors $(\{k\}, \mathcal{A}^X(n))$ is defined as the set of clocks $i \in \mathcal{V}^X \setminus \{k\}$ such that $(i, k) \in \mathcal{A}^X(n)$ and where $\{k\}$ denotes the singleton $k$.

In essence, for any clock or agent $k$ from team $X$ and $X=E, P$ at the nth period, the ideal pulse-coupled oscillator model receives, in an interval of duration $T_k$ around its local clock tick $t_k^X(n)$ a combination $\Delta t_k^X(n+1)$ of the pulse waveforms transmitted by other agents or clocks:

$$t_k^X(n+1) = t_k^X(n) + \varepsilon^X \Delta t_k^X(n+1) + T_k^X + v_k^X(n) \quad (4)$$

$$\Delta t_k^X(n+1) = \frac{I_k^X(n)}{|\text{Neighbors}(\{k\}, \mathcal{A}^X(n))|} \cdot \sum_{i \in \text{Neighbors}(\{k\}, \mathcal{A}^X(n))} T_i^X(n) w_{ki}^X(n) [t_i^X(n) - t_k^X(n)] \quad (5)$$

where $v_k^X(n)$ depicts phase noise, and is assumed here to be a random process with independent identically distributed scalar with zero mean and given variance $\sigma_k^X$. The local coupling coefficients $w_{ki}^X$, as noted, are selected so that $w_{ki}^X(n) > 0$ and $\Sigma_{i \in \text{Neighbors}(\{k\}, \mathcal{A}^X_{(n)})} w_{ki}^X(n) = 1$. In a sense, the selection of the coupling coefficients $w_{ki}^X(n)$:

$$w_{ki}^X(n) \frac{p_{ki}^X(n)}{\sum_{j \in \text{Neighbors}(\{k\}, \mathcal{A}^X(n))} p_{kj}^X(n)} \quad (6)$$

captures the abstraction of clocks meeting pairwise, within which time differences measured over low power channels should be weighted less when updating the clock. In addition, the actual power $p_{ki}^X(n)$ of the timing pulse received by clock $k$ transmitted from clock $i$ is governed by $$p_{ki}^X(n) = p_i^X(n) \frac{|h_{ki}|^2}{d_{ki}^\gamma(n)}; X = E, P \quad (7)$$

where $p_i(n)$ denotes the power of the transmitted pulse signal, $h_{ki}$ defined by the standard complex normal distribution $CN(0, 1)$ is the quasi-static Rayleigh fading channel, $d_{ki}(n)$ is the clock distance, and $\gamma$ denotes the path loss exponent.

For simplicity, there is an additional innocuous assumption, where potential convergence properties of (4)-(5) are investigated under network frequency synchrony, implying that all the clocks share the same period $T^X = T_1^X = \ldots = T_{N^X}^X$. Therefore, the state of any clock $k$ can be updated $$t_k^X(n) = nT^X + \tau_k^X(n) \quad (8)$$

where $\tau_k^X(n)$ is the timing phase with $0 \leq \tau_k^X(n) < T^X$. Consequently, it is also insightful to examine the social network of pulse-coupled synchronization (4)-(5) in view of (8) under frequency synchrony conditions; e.g., $$\tau_k^X(n+1) = \tau_k^X(n) + \varepsilon^X \Delta \tau_k^X(n+1) + v_k^X(n) \quad (9)$$

$$\Delta \tau_k^X(n+1) = \frac{I_k^X(n)}{|\text{Neighbors}(\{k\}, \mathcal{A}^X(n))|} \cdot \sum_{i \in \text{Neighbors}(\{k\}, \mathcal{A}^X(n))} T_i^X(n) w_{ki}^X(n) [\tau_i^X(n) - \tau_k^X(n)] \quad (10)$$

where |•| denotes the cardinality of the enclosed set of neighboring clocks of clock $k$.

Multi-Agent Dynamics: To understand the progress that is being made in implementing multi-agent dynamics, it is first necessary to characterizing each kth clock from team X and X=E, P at the nth period by a real state variable $x_k^X(n)$ and an input $u_k^X(n)$. Expressed in these local coordinates, the phases $\tau_k^X(n)$ and measures of disagreement $\Delta\tau_k^X(n-1)$ of the distributed physical-layer synchronization (9)-(10) become $$x_k^X(n+1) = x_k^X(n) + \varepsilon^X u_k^X(n) + v_k^X(n) \tag{11}$$

$$u_k^X(n) = \frac{I_k^X(n)}{|\text{Neighbors}(\{k\}, \mathcal{A}^X(n))|} \cdot \sum_{i \in \text{Neighbors}(\{k\}, \mathcal{A}^X(n))} T_i^X(n) w_{ki}^X(n)[x_i^X(n) - x_k^X(n)] \tag{12}$$

wherein a remark on the present model (11) is in order. Future and updated value of any clock in the network is a convex combination of its current value, as well as current values of its neighbors. Therefore, it is clear that the step size $\varepsilon^X$ should be properly set to maintain convexity property or contraction characteristic of (11). To this end, for system stability, $\varepsilon^X$ is appropriate in the range of $0<\varepsilon^X<1$.

In this setting, the provision of Bernoulli random distributions will form an important part of the background for local views of selecting transmit clocks, in the set of cu gently active ones. Therefore, from a distributed synchronization viewpoint, a dock be indeed present in many of the local views of other docks exchanging thus, a number of pulse signals per period. By defining the notation $\mathcal{N}_k^X$ Neighbors($\{k\}, \mathcal{A}^X(n)$)$\cup\{k\}$ for all neighbors of agent k, including itself, the cardinality of $\mathcal{N}_k^X$ as $N_k^X$, the vector containing the timing phases of $\mathcal{N}_k^X$ as $x\mathcal{N}_k^X(n)[x_1^X(n), \ldots, x_{N_k}^X(n)]$, and the vector of phase points $v_{z \leftarrow}^X(n)[v_1^X(n), \ldots, v_{N_k}^X(n)]$, the collective dynamics of the pulse-coupled discrete time synchronization (12) can be expressed as the stochastic difference equation $$x\mathcal{N}_k x^X(n-1) = A \mathcal{N}_k x^X(n) x \mathcal{N}_k x^X(n) + v \mathcal{N}_k x^X(n) \tag{13}$$

where $A\mathcal{N}_k x(n)$ is a $N_k^X \times N_k^X$ matrix such that its elements $[A \mathcal{N}_k^X(n)]_{ii} = 1-\varepsilon^X$ on the main diagonal and $$\left[A_{\mathcal{N}_k^X}^X(n)\right]_{ki} = \varepsilon^X \frac{I_k^X(n)}{|\text{Neighbors}(\{k\}, \mathcal{A}^X(n))|} T_k^X(n) w_{ki}^X(n) \text{ for } i \neq k.$$

By construction, the matrix $A \mathcal{N}_k x^X(n)$ in team X and X=E, P is nonnegative and stochastic due to the fact that the sum of the elements on each row sums to one. The expectation E $\{x \mathcal{N}_k x^X(n)\}$ behaves as the deterministic discrete-time case; i.e., phase noise-free, where the aspects of the ergodic analysis and products of stochastic matrices in (13) are matters of critical importance for the stability properties of the multiagent systems with time-dependent communication links.

Standard Interference Functions: Of considerable concern are the facts that both necessary and sufficient conditions for the convergence of all the immediate neighbors from the local view $\mathcal{N}_k^X$ of team X and X=E, P together with agent k to a common value as n getting large, depend not only on the connectivity properties of the sequence of communication graphs but also on the associated weight functions. In effect, the received pulse signal power levels can be used as weighting factors. Essentially this striking feature of recent practice involves being able to improve network manageability, namely via judicious topology reweighting.

To this end, immediate neighbor i may update its weights on its out-going links $w_{ki}^X(n)$ as described in (6), if agent k can receive pulse signal and/or information from agent i. For simplicity, the channel gain of agent i to agent k in team X and X=E, P that is available through channel estimation, is denoted as $h_{ki}^X(n)$ at the period n. At agent k, the received pulse signal power of agent i is $h_{ki}^X(n) p_i^X(n)$ while the local network interference seen by agent i at agent k is $\Sigma_{j \in \mathcal{N}_k^X} h_{kj}^X(n) p_j^X(n) + \sigma_k^X(n)$ where $\sigma_k^X(n)$ denotes the receiver noise power at agent k. Henceforth, under power vector $p\mathcal{N}_k x^X(n)[p_1^X(n), \ldots, p_{n_i}^X(n)]$, the signal-to-interference-plus-noise ratio (SINR) of agent i at agent k is $p_i^X(n)\mu_{ki}^X(p\mathcal{N}_k x^X)$ provided that $$\mu_{ki}^X\left(p_{\mathcal{N}_k}^X\right) \frac{h_{ki}^X(n)}{\sum_{j \in \mathcal{N}_k^X \setminus \{i\}} h_{ki}^X(n) p_j^X(n) + \sigma_k^X(n)}. \tag{14}$$

Moreover, it is also worth noting that $$\mu_{ki}^X\left(p_{\mathcal{N}_k}^X\right) = \frac{h_{ki}^X(n)}{R_{ki}^X\left(p_{\mathcal{N}_k}^X\right) - h_{ki}^X(n) p_i^X(n)} \tag{15}$$

where $R_k^X(p\mathcal{N}_k x^X)\Sigma_{j \in \mathcal{N}_k^X} h_{kj}^X(n) p_j^X(n) + \sigma_k^X(n)$ denotes the total pulse power received at agent k of team X and X=E, P. It is plausible to view the power emission of agent i knowing only its own uplink gains and the total power received at each agent k.

As far as perceived the above background is concerned, it is appropriate to relate more closely at this point that, the interfering signals at clocks k and k' appear to clock i as independent noises. That said, the maximal ratio combining of the received pulse signals for clock i in team X and X=E, P at all its immediate neighboring clocks $k \in \mathcal{N}_i^X$, yields an SINR constraint for clock or agent of the form $$p_i^X(n) \sum_{k \in \mathcal{N}_i^X} \mu_{ki}^X\left(p_{\mathcal{N}_i}^X\right) \geq \gamma_i^X(n). \tag{16}$$

Or, equivalently, for each $n \in N$ $$p_i^X(n) \geq I_i^X\left(p_{\mathcal{N}_i}^X\right) \frac{\gamma_i^X(n)}{\Sigma_{k \in \mathcal{N}_i^X} \mu_{ki}^X\left(p_{\mathcal{N}_i}^X\right)} \tag{17}$$

where the desired SINR $\gamma_i^X(n)$ for clock i in team X is embedded in the interference function $I_i^X(p\mathcal{N}_i x^X)$.

A more detailed review of the interference function $I_i^X(p\mathcal{N}_i x^X)$ is the property of positivity; i.e., $I_i^X(p\mathcal{N}_i x^X)>0$ due to a nonzero background receiver noise. Also relevant is $\Sigma_{l \in \mathcal{N}_i} \mu_{ki}^X(p\mathcal{N}_i x) \leq \Sigma_{k \in \mathcal{N}_i} \mu_{ki}^X(p\mathcal{N}_i x)$ when $p\mathcal{N}_i x^X \geq \tilde{p}\mathcal{N}_i x^X$. Thus, it follows that $I_i^X(p\mathcal{N}_i x^X) \geq I_i^X(\tilde{p}\mathcal{N}_i x^X)$ for any given $\gamma_i^X(n)$ and $n \in N$. In other words, the interference function $I_i^X(p\mathcal{N}_i^X)$ satisfies the monotonicity property. And indeed, another observation of $$\frac{i}{\alpha}\mu_{ki}^X(p_{Ni^X}^X) < \mu_{ki}^X(\alpha p_{Ni^X}^X)$$

for all $\alpha > 1$, which leads to the fact of $\alpha I_i^X(p\mathcal{N}_i^X) > I_i^X(\alpha p\mathcal{N}_i^X)$. As such, the interference function $I_i^X(p\mathcal{N}_i^X)$ further satisfies the scalability property. In this regard, if clock i has acceptable connections with its neighborhood $\mathcal{N}_i^X$ under power vector $p\mathcal{N}_i^X(n)$, then it will even have higher quality connections when all powers of $\mathcal{N}_i^X$ are scaled up uniformly.

With all the measures such as positivity, monotonicity, and scalability, $I_i^X(p\mathcal{N}_i^X)$ is considered as standard. If $p\mathcal{N}_i^X$ is a feasible power vector satisfying the constrain (17), then iterations of $I_i^{X,(m)}(p\mathcal{N}_i^X)$ yields a monotone decreasing sequence of feasible power vectors that converges to a unique fixed point $p\mathcal{N}_i^{X,*}$. Furthermore, only when $I_i^X(p\mathcal{N}_i^X)$ is feasible and for any initial power vector $p\mathcal{N}_i^X$, can the sequence of $I_i^{X,(m)}(p\mathcal{N}_i^X)$ be expected to be monotonically increasing, thereby converging to the fixed point $p\mathcal{N}_i^{X,*}$. In essence, it is desirable in practice that clocks may have limited power emissions.

Mean-Square Stability Analysis: In relation to the weighted average $w_{ki}^X(n)$ governed by (6) of the residual difference (also known as the convex hull) of timing phases as measured with respect to other clocks or agents in team X and X=E, P, there exist real numbers $e_{max} \geq e_{min} > 0$, these bounds must then be placed in the context of the coupling or clustering coefficients of clocks or agents; e.g., $e_{min} \leq w_{ki}^X(n) \leq e_{max}$ for all $n \in N$, building on the results presented above. Against these premises, the equilibrium point is mean-square stable if for any given initial state $x^{\mathcal{N}_k^X X}(n_0)$, $\Theta^{\mathcal{N}_k^X X}(n) E\{x^{\mathcal{N}_k^X X}(n)(x^{\mathcal{N}_k^X X}(n))^T\}$ is well defined for any $n \in N$, and $$\lim_{n \to \infty} \Theta_{N_k^X}^X(n) < \infty.$$

With that said, one can easily see the proof as follows)

$$\Theta^{\mathcal{N}_k^X X}(n+1) = A^{\mathcal{N}_k^X X}(n)\Theta_{z,86}^X(n)(A^{\mathcal{N}_k^X X}(n))^T + \Sigma^{\mathcal{N}_k^X X} \quad (18)$$

where for all $n \in N$, $E\{v_{z,86}^X(n)(v_{z,86}^X(n))^T\} = \Sigma^{\mathcal{N}_k^X X} \delta(0)$ and $\Sigma^{\mathcal{N}_k^X X} = \text{diag}(\sigma_1^X, \ldots, \sigma_{N_k}^X)$.

As noted previously, the result (13) can then be rewritten in a vector form; e.g., $$vec(\Theta^{\mathcal{N}_k^X X}(n+1)) = A^{\mathcal{N}_k^X X}(n) \otimes A^{\mathcal{N}_k^X X}(n) vec(\Theta^{\mathcal{N}_k^X X}(n)) + vec(\Sigma^{\mathcal{N}_k^X X}) \quad (19)$$

where $\otimes$ denotes the Kronecker product of matrices and vec{•} represents the vectorize operator of enclosed matrices. Consequently, the mean-square stabilization of (19) is equivalent to the mean-square stabilization of $$vec(\Theta^{\mathcal{N}_k^X X}(n+1)) = A^{\mathcal{N}_k^X X}(n) \otimes A^{\mathcal{N}_k^X X}(n) vec(\Theta^{\mathcal{N}_k^X X}(n)) \quad 20)$$

whose discrete-time solution is given by $$vec(\Theta^{\mathcal{N}_k^X X}(n+1)) = (A^{\mathcal{N}_k^X X}(n) \otimes A^{\mathcal{N}_k^X X}(n))^{(n+1-n_0)} vec(\Theta^{\mathcal{N}_k^X X}(n_0)) \quad (21)$$

According to the algebraic graph theory, all the eigenvalues of $A^{\mathcal{N}_k^X X}(n)$ and $n \in N$ associated with the cluster $\mathcal{N}_k^X$ of the clock or agent k in team X are found to be less than 1, and thus, the mean-quare stabilization is concluded herein.

Interference Averaging and Cluster Dynamics: Among variables influencing clocks or agents' transmit powers are inaccurate power measurements, the needed powers $I_i^k(p\mathcal{N}_k^X)$ are a vital resource to support the standard interference averaging power control iteration as follows:

$$p^{\mathcal{N}_k^X X}(n+1) = \pi^{\mathcal{N}_k^X X}(n) + (1-\pi^{\mathcal{N}_k^X X})I^{\mathcal{N}_k^X X}(p^{\mathcal{N}_k^X X}(n)) \quad (22)$$

where $I^{\mathcal{N}_k^X X}(p^{\mathcal{N}_k^X X}(n))[I_1^X(p^{\mathcal{N}_k^X X}(n)), \ldots, I^{\mathcal{N}_k^X X}(p^{\mathcal{N}_k^X X}(n))]$ is associated with the local view or neighborhood $\mathcal{N}_k^X$ of clock k in team X and X=E, P. Notice that $I_j^X(p^{\mathcal{N}_k^X X}(n))$ denotes the effective interference of other clocks that clock j must overcome. The constant $\pi^{\mathcal{N}_k^X X}$ associated with the cluster $\mathcal{N}_k^X$ of clock or agent k is $0 \leq \pi^{\mathcal{N}_k^X X} < 1$.

At each step of this iterative procedure, clock or agent j in team X and X=E,P is assigned to its cluster or local view $\mathcal{N}_j^X$ at which its SINR is attained. Using these local views $\mathcal{N}_j^X$ and $j=1, \ldots, N_k^X$ to receive the clock pulse signal of clock or agent j, the standard interference averaging power control iteration can be rewritten as:

$$p^{\mathcal{N}_k^X X}(n+1) = A^{\mathcal{N}_k^X X,P}(n)p^{\mathcal{N}_k^X X}(n) + B^{\mathcal{N}_k^X X,P}(n)u_{z,87}^X(n) \quad (23)$$

where the power system coefficients are defined by $A^{\mathcal{N}_k^X X,P}(n)\pi^{\mathcal{N}_k^X X}I_{N_k^X \times N_k^X}$ and $$B_{N_k^X}^{X,p}(n)\left(1 - \pi_{N_k^X}^X\right)\text{diag}\left(\frac{1}{\Sigma_{k \in N_1^X}\mu_{k1}^X\left(p_{N_k^X}^X(n)\right)}, \ldots, \frac{1}{\Sigma_{k \in N_{N_k^X}^X}\mu_{kN_k^X}^X\left(p_{N_k^X}^X(n)\right)}\right).$$

When effectively countering potential misbehaving clocks, the control variables $u^{\mathcal{N}_k^X X}(n)[\gamma_1^X(n), \ldots, \gamma_{N_j^X}^X(n)]^T$ are carefully designed to maintain appropriate qualities of communication link closures and to establish reliable grounds for time synchronization.

Protagonist and Antagonist Interactions: From the perspective of "no man is an island", a main insight is that mutual timing synchronization is vulnerable to attacks; i.e., protagonist clocks are not immune from disruption by false timing injection from antagonist docks. Protagonist and antagonist interactions are now modeled as a multi--team adversarial system consisting of two opposing teams, each of them described by protagonist clocks or evaders $\mathcal{V}^E$ and antagonist clocks or pursuers $\mathcal{V}^P$.

Specifically, the clock or agent i's state in each team evolves according to the dynamical equation (13). Communications between $\mathcal{V}^E$ and $\mathcal{V}^P$ teams are further described by a time-variant bipartite graph $\mathcal{G}^{EP}(n) = (\mathcal{G}^e, \mathcal{G}^P, E^{EP}, \mathcal{A}^{EP}(n))$, where $\mathcal{V}^E = \{1, \ldots, N^E\}$ and $\mathcal{V}^P = \{1, \ldots, N^P\}$ are the sets of vertices, $\mathcal{E}^{EP} \subseteq \mathcal{V}^E \times \mathcal{V}^P$ is the set of arcs, and $\mathcal{A}^{EP}(n)$ is the time-varying weighted adjacency matrix of $\mathcal{G}^{EP}(n)$. The (i,j)th entry of $\mathcal{A}^{EP}(n)$, $[\mathcal{A}^{EP}]_{ij}(n)$, is nonzero if and only if at the period $n \in N$ and for some antagonist agent j and $j \in \mathcal{V}^P$, there is an arc $(i, j) \in \mathcal{E}^{Ep}$ for some $i \in \mathcal{V}^E$, implying that antagonist agents can observe other protagonist agents. Also relevance about the pursuit-evasion graph $\mathcal{G}^{EP}(n)$ are the in-degree matrix $\mathcal{D}_{in}^{EP}(n)$ and the out-degree matrix $\mathcal{D}_{out}^{EP}(n)$.

Moreover, it is worthwhile noticing that the power $p_{ij}^{EP}(n)$ received at protagonist clock or agent i transmitted from antagonist clock or agent j at the period n is given by $$p_{ij}^{EP}(n) = \frac{G_{i,j,Tx}^P G_{i,j,Rx}^E \lambda_j^2}{(d_{i,j}^{EP})^2(n)} p_j^P(n) \quad (24)$$

where $p_j^P(n)$ is the false timing signal power transmitted by the antagonist clock or agent j at the period n and whereas $G_{i,j,Tx}^P$ is the antagonist clock or agent j's transmitter gain towards the direction of the protagonist clock or agent i, $G_{i,j,Rx}^E$ is the protagonist clock or agent i's receiver gain towards the direction of the antagonist clock or agent j, $\lambda_j$ denotes the carrier wavelength of the antagonist clock or agent j's false timing signal, and $d_{ij}^{EP}(n)$ is the distance between the opposing clocks or agents.

The edge weights $[\mathcal{A}^{EP}]_{ij}(n)$ are chosen by the normalized power; e.g., $$[\mathcal{A}^{EP}]_{ij}(n) = \frac{p_{ij}^{EP}(n)}{\sum_{j \in N_i^{EP}} p_{ij}^{EP}(n)} \quad (25)$$

where $\mathcal{N}_i^{EP}$ denotes the cluster of antagonist clocks of the protagonist clock i, whose interactions between pairs of agents belonging to different teams are antagonistic.

Specifying Objectives and. Attributes: Throughout the present disclosure, the time-variant, weighted, and undirected graphs $\mathcal{G}^X(n)$ and X=E,P, describing the protagonist and antagonist relationships among agents, are presumably connected. In graph theoretic terms, the Laplacian matrix associated with the adjacency matrix $\mathcal{A}^X(n)$ defined as $L^X(n) = C^X(n) - \mathcal{A}^X(n)$, where $C^X(n)$ is the diagonal connectivity matrix, whose diagonal entries are the sums of the corresponding row entries of $\mathcal{A}^X(n)$; i.e., $[C^X]_{ii}(n) = \Sigma_{(i,j) \in E^X} [\mathcal{A}^X]_{ij}(n)$, for all $i \in [1, N^X]$.

Under the mean-square stabilizability on the state-space model (21) describing the dynamics of each agent, team decision making for the interplay between individual agent protagonist and antagonist behaviors is next developed both in terms of random transmit selections and in terms of the weights of the "cooperative and sabotage interactions" among clocks. For illustration, multiple antagonist clocks tend to attract to other antagonist clocks and to the protagonist clocks that they can connect, whose local neighborhood tracking errors are given by $$e_{x_i^P}^P(n) = \sum_{k \in N_i^P} [\mathcal{A}^P]_{ki}(n)[x_k^P(n) - x_i^P(n)] + \sum_{j \in N_i^E} [\mathcal{A}^{EP}]_{ji}(n)[x_j^E(n) - x_i^P(n)] \quad (26)$$

Likewise, the cluster of protagonist clocks attract to other protagonist clocks yet seek to avoid antagonist clocks;

$$e_{x_j^E}^E(n) = \sum_{l \in N_j^E} [\mathcal{A}^E]_{jl}(n)[x_l^E(n) - x_j^E(n)] + \sum_{i \in N_j^P} [\mathcal{A}^{EP}]_{ji}(n)[x_i^P(n) - x_j^E(n)] \quad (27)$$

Upon defining the cluster tracking error vectors $$e_{X_{\mathcal{N}_i^P}}^P(n) \left[ e_{X_1^P}^P(n), \ldots, e_{X_{N_i^P}^P}^P(n) \right]$$

and $$e_{X_{\mathcal{N}_j^E}}^E(n) \left[ e_{X_1^E}^E(n), \ldots, e_{X_{N_j^E}^E}^E(n) \right].$$

Then, it is straightforward to show $$e_{x_{\mathcal{N}}^P}^P(n) = -[L^P(n) + D_{in}^{EP}(n)] x_{\mathcal{N}^P}(n) \mathcal{A}^{EP}(n) x_{\mathcal{N}^E}(n) \quad (28)$$

$$e_{x_{\mathcal{N}}^E}^E(n) = -[L^E(n) - \mathcal{D}_{out}^{EP}(n)] z_{\mathcal{N}^E}(n) - (\mathcal{A}^{EP}(n)) T_{X_{\mathcal{N}^P}}^P(n) \quad (29)$$

At this point, each antagonist clock with $u_i^P(n)$ minimizes its cluster neighborhood tracking errors and energy consumption and whereas each protagonist clock with $u_j^E(n)$ desires to make the tracking errors observed by antagonist clocks large and forces antagonist clocks to expend more energy. More precisely, these social behavior can be captured in a multi-attribute payoff associated with protagonist cluster $N^E$ and antagonist cluster $N^P$, and thereby, relatively straightforward expressed in a simple quadratic functional $$J_{\mathcal{N}^P, \mathcal{N}^E}(n_0) = \sum_{n=n_0+1}^N L(n, x_{\mathcal{N}^P}^P(n), x_{\mathcal{N}^E}^E(n), u_{\mathcal{N}^P}^P(n-1), u_{\mathcal{N}^E}^E(n-1)) \quad (30)$$

where $n_0$ is the smallest element of the decision making horizon $I = \{n_0, \ldots, N\}$ and the payoff function $L: I \times R^{N^P} \times R^{N^E} \times R^{N^P} \times R^{N^E}$ is given by $$L(n, x^P \mathcal{N}_p(n), x^E \mathcal{N}_E(n), u^P \mathcal{N}_P(n-1), u^E \mathcal{N}_E(n-1))$$
$$(e^P_x \mathcal{N}_P(n))^T R_P^{-1}(n) e^P_x \mathcal{N}_P(n) - (e^E_x \mathcal{N}_E(n))^T$$
$$R_E^{-1}(n) e^E_x \mathcal{N}_E(n) + (u^P \mathcal{N}_P(n-1))^T R_P(n-1) u^P$$
$$\mathcal{N}_P(n-1) - (u^E \mathcal{N}_E(n-1))^T R_E(n-1) u^E \mathcal{N}_E(n-1) \quad (31)$$

and the selective weights $R_P(n)$ and $R_E(n)$ are positive definite, bounded and symmetric; whereas for $U^X(n)\{u^X \mathcal{N}_X(n_0), u^X \mathcal{N}_X(n_0+1), \ldots, u^X \mathcal{N}_{X(n)) and} v^X(n)\{v^X \mathcal{N}_X(n_0), v^X \mathcal{N}_X(n_0+1), \ldots, v^X \mathcal{N}_X(n)\}$, the unique solutions $x^X \mathcal{N}_s^X(n) x^X \mathcal{N}_X(n; n_0, x^X \mathcal{N}_X(n_0); U^X(n-1), V^X(n-1)$ satisfying the cluster dynamics shown in (13) and (23); e.g., $$X^X \mathcal{N}_X(n+1) = A^X \mathcal{N}_X(n) x^X \mathcal{N}_X(n) + v^X \mathcal{N}_X(n); X = E, P \quad (32)$$

$$P^X \mathcal{N}_X(n+1) = A^{X,p} \mathcal{N}_X(n) P^X \mathcal{N}_X(n) + B^{X,p} \mathcal{N}_X(n) u^X \mathcal{N}_X(n) \quad (33)$$

Pursuit-Evasion Graphical. Games: Next it is critical to embark upon the multi-team adversarial systems that describe cluster dynamics of $\mathcal{N}^X$ interacting clocks or agents in opposing teams X and X=E,P, where antagonist team P purposefully wishes to influence protagonist tear P with its misinformation on timing. More formally, the multi-team dynamical system for competitive time synchronization among protagonist and antagonist clocks is formed by aggregating (32) and (33) and for $n \in I$ $$z(n+1) = A(n)z(n) + B_P(n)up(n) + B_E(n)u_E(n) + G(n)w(n); z(n_0) \quad (34)$$

where $z^T(n)[X^P \mathcal{N}_P(n), x^E \mathcal{N}_E(n), P^P \mathcal{N}_P(n), P^E \mathcal{N}_E(n)]$ is the aggregate system state, $u_P(n)u^P \mathcal{N}_P(n)$ is the cluster decision strategy of antagonist clocks, $u_E(n)u^E \mathcal{N}_E(n)$ is the cluster decision strategy of protagonist clocks, and $w^T(n)[v^P \mathcal{N}_P(n),$ $v^E \mathcal{N}_E(n)$] is the actuation noise sequence of identically distributed, zero mean independent Gaussian variables with covariance matrix given by $Q_W \text{diag}(\Sigma^P \mathcal{N}_P, \Sigma^E \mathcal{N}_E)$. And the aggregate system coefficients are defined by $A(n)ccccS^P \mathcal{N}_P(n) \; 00 \; 0$ $0 A^E \mathcal{N}_E(n) \; 00$ $00 \; A^{P,P} \mathcal{N}_P(n) 0$ $00 \; 0 A^{E,P} \mathcal{N}_E(n);$ $B_P(n)c0$ $0$ $B^{P,P} \mathcal{N}_P(n)$ $0; B_E(n)c0$ $0$ $0$ $B^{E,P} \mathcal{N}_E(n);$ $G^T(n)cccc0 \; 0I \; 0$ $00 \; 0I.$ Further let $T_{11}(n)(L^P(n) + \mathcal{D}_{in}^{EP}(n))^T R_P^{-1}(n)(L^P(n) + \mathcal{D}_{in}^{EP}(n)) +$
$\mathcal{A}^{EP}(n) R_E^{-1}(n)(\mathcal{A}^{EP}(n))^T T_{12}(n) - (L^P$
$(n) + \mathcal{D}_{in}^{EP}(n))^T R_P^{-1}(n) A^{EP}(n) + \mathcal{A}^{EP}(n) R_E^{-1}(n)$
$(L^E(n) - L_{out}^{EP}(n)) T_{22}(n)(\mathcal{A}^{EP}(n))^T R_P^{-1}(n)$
$\mathcal{A}^{EP}(n) + (L^E(n) - \mathcal{D}_{out}^{EP}(n))^T R_E^{-1}(n)(L^E(n) - \mathcal{D}_{out}^{EP}(n)))$ then, the payoff function (31) can be rewritten as $$L(n,z(n),u_E(n),u_E(n)) = z^T(n) Q(n-1) z(n) + u^T_P(n-1) R_P(n-1) u_P(n-1) - e_E^T(n-1) R_E(n-1) u_E(n-1) \quad (35)$$

where the bounded symmetric matrix $Q(n)$ is given by $Q(n)cccT(n)0 \; 0$ $00 \; 0$ $00 \; 0; T(n)ccT_{11}(n) T_{12}(n)$ $T_{12}^T(n) T_{22}(n)$ Lastly, the payoff (30) in the final form of $$J_{\mathcal{N}^P, \mathcal{N}^E}(n_0) = \sum_{n=n_0+1}^{N} \left[ z^T(n) Q(n-1) z(n) + u_P^T(n-1) R_P(n-1) u_P(n-1) - u_E^T(n-1) R_E(n-1) u_E(n-1) \right] \quad (36)$$

is a random variable and consequently the first of its statistical moments must be selected for optimization.

By construction, the matrices $A^P \mathcal{N}_P(n)$, $A^E \mathcal{N}_E(n)$, $A^{P,P} \mathcal{N}_E(n)$, and $A^{E,P} \mathcal{N}_E(n)$ are invertible. Consequently, the matrices $[A(n) - \lambda I, B_P(n)]$ and $[A(n) - \lambda I, B_E(n)]$ have full row rank for all $\lambda \in C_0^+$. In other words, both $(A(n), B_P(n))$ and $(A(n), B_E(n))$ are individually stabilizable. In particular, it also implies that $(A(n), [B_P(n), B_E(n)])$ is also stabilizable. Thus, for any initial state $z(n_0)$, there exist pursuit-evasion strategies based on edge weights such that the solution of the dynamical game described by (34.) is stabilizable.

Stochastic Linear-Quadratic Gaines: In the sequel, the application of the theory of dynamic games tcresilient synchronization of protagonist and antagonist timing transfers is considered. The analysis is motivated by the widespread of information available across protagonist and antagonist clock clusters and more explicitly, both opposing teams are aware of the dynamic parameters of the discrete-time linear-quadratic dynamic game; e.g., $(A(n), B_P(n), B_E(n))$; the payoff functional parameters $(Q(n), R_P(n), R_E(n))$; and the planning horizon I; during the game, at time instant n, $n=n_0, n_0+1, \ldots, N$, both teams have access to the system state $z(n)$.

Recall that payoff uncertainty is introduced by allowing the dynamics of the subject game to be perturbed by the phase noises of the Gaussian process type, meaning that the payoff (36) is now a random number. When the influence of the process noise sequence $W(n)\{n_0, n_0+1, \ldots, n\}$ is taken into account, this defines an expectation denoted by $E_{w(n)}\{\bullet\}$ for the payoff functional $$J\left(\{u_P(n)\}_{n=n_0}^{N-1}, \{u_E(n)\}_{n=n_0}^{N-1}; z(n_0)\right) = \quad (37)$$
$$E_w \left\{ \sum_{n=n_0}^{N-1} \left[ z^T(n+1) Q(n) z(n+1) + u_P^T(n) R_P(n) u_P(n) - u_E^T(n) R_E(n) u_E(n) \right] \right\}.$$

Under the assumption of complete state information, the bulk of the following analysis characterizes the value function denoted by $V_n(z(n))$, where $z(n)$ is satisfying (34) and $n = n_0, n_0+1, \ldots, N-1$. In particular, one can set up the dynamic programming recursion and $$V_N = (z(N)) = 0 \quad (38)$$

$$V_n(z(n)) = \min_{u_P(n)}$$
$$\max_{u_E(n)} E_{w(n)} \{ z^T(n+1) Q(n) z(n+1) + u_P^T(n) R_P(n) u_P(n) - u_E^T(n) R_E(n) u_E(n) +$$
$$V_{n+1}[A(n) z(n) + B_P(n) u_P(n) + B_E(n) u_E(n)] \}.$$

Intuitively, the value function associated with the subject game is quadratic in the state and has therefore has the form $$V_v(z(n)) = z^T(n) P(n) z(n) + p(n) \quad (39)$$

where $P(n)$ are real, symmetric matrices and $p(n)$ are scalars. It is seen that the substitution of (39) into the dynamic programming recursion (38) yields the boundary conditions $P(N) = 0$ and $p(N) = 0$.

Moreover, it is particularly relevant to observe that $$z^T(n) P(n) z(n) + p(n) = \quad (40)$$
$$\min_{u_P(n)} \max_{u_E(n)} E_{w(n)} \{ u_P^T(n) R_P(n) u_P(n) - u_E^T(n) R_E(n) u_E(n) +$$
$$[A(n) z(n) + B_P(n) u_P(n) + B_E(n) u_E(n) + G(n) w(n)]^T [Q(n) +$$
$$P(n+1)][A(n) z(n) + B_P(n) u_P(n) + B_E(n) u_E(n) + G(n) w(n)] + p(n+1) \}.$$

Or equivalently, it follows that $$z^T(n)P(n)z(n) + p(n) = \min_{u_P(n)} \max_{u_E(n)} \{u_P^T(n)R_P(n)u_P(n) - u_E^T(n)R_E(n)u_E(n) + \quad (41)$$
$$[A(n)z(n) + B_P(n)u_P(n) + B_E(n)u_E(n)]^T[Q(n) + P(n+1)][A(n)z(n) +$$
$$B_P(n)u_P(n) + B_E(n)u_E(n)] +$$
$$Tr\{G^T(n)[Q(n) + P(n+1)]G(n)Q_W\} + p(n+1)\}.$$

Next, based on the analysis in [14], the forward recursive matrix-valued equation for P(n) is similarly obtained, and thereby, summarized as follows $$P(n+1) = A^T(n)\{P(n) - P(n)[B_P(n)S_B^{-1}(P(n))B_P^T(n) + B_P$$
$$(n)S_B^{-1}(P(n))B_P^T(n)P(n)B_E(n)[R_E(n) - B_E^T(n)P$$
$$(n)B_E(n)]^{-q}B_E^T(n) - B_E^T(n) + B_E(n)[R_E(n) - B_E^T(n)$$
$$P(n)B_E(n)]^{-1}Bphd\ E^T(n)P(n)B_P(n)S_B^{-1}(P(n))B_P^T$$
$$(n) + B_E(n)[R_E(n) - B_E^T(n)P(n)B_E(n)]^{-1}B_E^T(n)P(n)$$
$$B_P(n) \cdot S_B^{-1}(P(n))B_P^T(n)P(n)B_E(n)[R_E(n) - B_E^T(n)$$
$$P(n)B_E(n)]^{-1} \cdot B_E^T(n) + B_E(n)[B_E^T(n)P(n)B_E(n) - R_E$$
$$(n)]^{-1}B_E^T(n)] \cdot P(n)\}A(n) + Q(n) \qquad (42)$$

and $$S_B^{-1}(P(n))B_P^T(n)P(n)B_P(n) + R_P(n) + B_P^T(n)P(n)B_E(n)$$
$$\cdot [R_E(n) - B_E^T(n)B_E(n)]^{-1}B_E^T(n)P(n)B_P(n) \qquad (43)$$

where the initial condition

In turn, the scalar forward recursive equation can be shown together with the initial condition $p(n_0) = 0$ $$p(n+1) = p(n) + Tr\{G^T(n)P(n)G(n)Q_W\}. \qquad (44)$$

In view of (42) and (43), it can be easily inferred that a necessary and sufficient condition for the existence of a solution P(n), and thereby, a solution to the discrete-time linear-quadratic dynamic game (34) is given by $$R_P(n) + B_P^T(n)P(n)B_P(n) > 0 \qquad (45)$$

$$R_E(n) > B_E^T(n)P(n)B_E(n). \qquad (46)$$

Consequently, the value of the subject protagonist and antagonist team dynamic game is given by $$V_0(z(n_0)) = z^T(n_0)[P(N) - Q(N)]z(n_0). \qquad (47)$$

Clock Steering with Complete State Observations: Briefly, the closed-form solutions to the discrete-time linear-quadratic dynamic game are obtained as follows. Protagonist clocks have access to the state z(n) at decision instant n. They then adapt short-term actions, i.e., SINRs (23) for iterative power emissions in accordance with the self-enforcing decision policy for "evasion" effects $$u_E^*(n) = [R_E(n) - B_E^T(n)P(N-n-1)B_E(n)]^{-1} B_E^T(n) \cdot \{I - P(N-n-1)B_P(n)S_B^{-1}(P(N-n-1))B_P^T(n) \cdot \{I + P(N-n-1)B_E(n)[R_E(n) - B_E^T(n)P(N-n-1)B_E(n)]^{-1} \cdot [B_E^T(n)]\}P(N-n-1)A(n)z(n) \qquad (48)$$

Moreover, dynamic distributed reweighting for resilient time synchronization is protagonist clocks' long-term objective, whose success depends on unavoidable counter-measures by antagonist clocks. In fact, antagonist clocks exploit the available information, including z(n) to inject misinformation about timing signals by means of the pursuit decision strategy for "sabotage purposes"; e.g., $$u_P^s(n) = -S_P^{-1}(P(N-n-1))B_P^T(n)\{I + P(N-n-1) \cdot B_E(n)[R_E(n) - B_E^T(n)P(N-n-1)B_E(n)]^{-1}B_E(n)\} \cdot P(N-n-1)A(n)z(n). \qquad (49)$$

Clock Steering with Knowledge of State Observations and Phase Noise Disturbances: A discussion of other relevant solutions for solving stochastic dynamic games would not be complete without mentioning potential impacts of the knowledge of environmental disturbances and uncertainties. As before, protagonist and antagonist clocks do have complete state information. In addition, the sample realizations of the random variable w(n) associated with the clock phase noises, are known and available at decision instant n for clock steering. As such, protagonist and antagonist clocks all agree on the fact that they are not only competing against each other, but simultaneously also against technological limitations.

Similar to the analysis in [14], a general trend is to consider the expectation after the optimization operation for the dynamic programming recursion; i.e $$V_n(z(n)) = \qquad (50)$$
$$E_{w(n)}\{\min_{u_P(n)} \max_{u_E(n)} \{z^T(n+1)Q(n)z(n+1) + u_P^T(n)R_P(n)u_P(n) - u_E^T(n)$$
$$R_E(n)u_E(n) + V_{n+1}[A(n)z(n) + B_P(n)u_P(n) + B_E(n)u_E(n) + G(n)w(n)]\}\}.$$

The prior discussion emphasized the relevance of the value function that is quadratic in the state; e.g., $$V_n(z(n)) = z^T(n)P(n)z(n) + p(n) \qquad (51)$$

which goes hand in hand with the process of $$z^T(n)P(n)z(n) + p(n) = \qquad (52)$$
$$E_{w(n)}\{\min_{u_P(n)} \max_{u_E(n)} \{u_P^T(n)R_P(n)u_P(n) - u_E^T(n)R_E(n)u_E(n) +$$
$$[A(n)z(n) + B_P(n)u_P(n) + B_E(n)u_E(n) + G(n)w(n)]^T$$
$$[Q(n) + P(n+1)][A(n)z(n) + B_P(n)u_P(n) + B_E(n)u_E(n) +$$
$$G(n)w(n) + G(n)w(n)] + p(n+1)\}\}.$$

Given this outlook, the optimal strategies for clock steering resulted from the optimization in (52) and the exploitation of inherent clock phase noise uncertainty, are obtained as follows. They are being deployed by protagonist and antagonist clocks to anticipate for the element of surprise.

$$u_P^*(n) = -S_P^{-1}(P(N-n-1))B_P^T(n)\{I + P(N-n-1) \cdot B_E(n)$$
$$[R_E(n) - B_E^T(n)P(N-n-1)B_E(n)]^{-1}B_E(n)\} \cdot P(N-$$
$$n-1)[A(n)z(n) + G(n)w(n)]. \qquad (53)$$

and $$u_E^*(n) = [R_E(n) - B_E^T(n)P(N-n-1) B_E(n)]^{-1}B_E^T(n) \cdot \{I -$$
$$P(N-n-1)B_P(n)S_B^{-1}(P(N-n-1))B_P^T(n) \cdot \{I + P(N-$$
$$n-1)B_E(n)[R_E(n) - B_E^T(n)P(N-n-1)B_E(n)]^{-1} \cdot B_E^T$$
$$(n)]\}P(N-n-1)[A(n)z(n) + G(n)w(n)]. \qquad (54)$$

Detection and Localization of Compromised Clocks: As an attempt in identifying misbehaving clocks, standard deviations $\sigma_{N_k}(n)$ of the clocks can be used; e.g., $$\sigma^2 N_k(n) \frac{1}{N_k} \sum_{i=1}^{N_k} \left[ z_i(n) - \frac{1}{N_k} \sum_{k=1}^{N_k} z_k(n) \right]^2 \qquad (55)$$

for analyzing situations, in which they measure how far a clock k deviates from the "wisdom of crowds" of its neighbors, $\mathcal{N}_k'$ and $\mathcal{N}_k' = I \equiv N_k$. To this end, this sort of cyber-attack indicators for clock k characterizes the extent its timing signals dispersed from the proper consensus with respect to its social network, and thereby, determining whether it is likely influenced by malicious and/or compromised clocks.

Conclusions: The present innovation has presented an analysis on physical-layer time synchronization in ad-hoc wireless networks, which employed coupled discrete-time oscillators corrupted by phase noises together with the assumption that these protagonist clocks were able to communicate with other nearby clocks. Bernoulli timing pulse arrival patterns were assumed, which allowed identification or discovery of peer clocks to not only act as random choice of neighbors and peer sampling, but also to address important concerns for total energy efficiency and network scalability. Mean-square stabilization and time-varying graph theoretics were used to facilitate the stability analysis of clusters of protagonist or protagonist clocks.

Intricate interactions via clock pulse power transmissions among remote clocks were observed and analyzed for positivity, monotonicity, and scalability, and thereby, leading to a framework for understanding of the convergence of common power controls. Also related to reweight the time synchronization network was the values of the SINRs for transmissions, which were further optimized to ensure acceptable connections in the presence of interferences caused by friendly neighboring clocks.

A further consideration was that sentient intruders, meaning that antagonist clocks could potentially inject false timing signals into the network synchronization dynamics of interest. The main tool for investigating the susceptibility of the spread of misinformation about timing signals was the class of discrete-time linear-quadratic dynamic games. In particular, the expected payoff for distributed time synchronization network was employed as an effective measure for the cluster of protagonist docks to dynamically reweight the interaction topology, and thereby, reducing the effect of the false timing signals on the synchronization network.

Unique to resilient time synchronization under antagonist interactions, proper power controls for the weights on the edges of the network governed by evasion policies with complete state feedback observations could help protagonist clocks maintaining residual timing errors below a given level while making the tracking errors observed by antagonist clocks large and forcing them to expend more energy. Unquestionably, nearly all distributed time synchronization has revolved around uncertain physical processes, i.e., phase noises. Therefore, the exploitation of the knowledge of environmental disturbances, from which the sample realizations of clock phase noises were taken into account, was significant for resilient consensus and persistent spread of misinformation. Interestingly, the value function provided a guarantee to the antagonist clocks; that is, as long as they keep their optimal play. Otherwise, the actually realized payoff would be better off for the protagonist clocks.

To achieve computational tractability of distributed pulse coupled synchronization, further work will be focused on time-scale separation arising from clustering. For instance, multiple tune-scale properties of the distributed synchronization network are utilized for potential decomposition for a set of smaller, numerically tractable cluster-level sub-problems.

The following references cited above are hereby incorporated by reference in their entirety.

[1] D. Li, K.D. Wong, Y.H. Hu, and A.M. Sayeed, "Detection, Classification, and Tracking of Targets," IEEE Signal Processing Magazine, Vol. 19. No. 2, pp. 17-29, 2002

[2] J.N. Laneman and G.W. Wornell, "Distributed Space-Time Coded Protocols for Exploiting Cooperative Diversity in Wireless Neworks," IEEE Transactions on Information Theory, Vol. 49, No. 10, pp. 2415-2425, 2003

[3] R. Mudumbal, J. Hespanha, and U. Madhow, "Scalable Feedback Control for Distributed Beamforming in Sensor Networks," Proceedings of IEEE int'l Symposium on Information Theory, pp. 137-141, 2005

[4] H. LeBlanc, H. Zhang, S. Sundaram, and X. Koutsoukos, "Consensus of Multi-agent Networks in the Presence of Adversaries Using Only Local Information," Proceedings of the 1st International Conference on High Confidence Networked Systems, pp. 1-10, 2012

[5] M. Thu and S. MartAnez, "On Distributed Constrained Formation Control in Operatorâ€ "Vehicle Adversarial Networks," Automatica, Vol. 49, No. 12, pp. 3571-3582, 2013

[6] G.D. Torre, T. Yucelen, and JD. Peterson, "Resilient Networked Multiagent Systems: A Distributed Adaptive Control Approach," 53th IEEE Conference Decision and Control. pp. 5367-5372. 2014

[7] F. Sivrikaya and B.F. Yener, "Time Synchronization in Sensor Networks: A Survey," IEEE Network, Vol. 18, No. 4, pp. 45â€"50, 2004

[8] E. Sourour and M. Nakagawa, â€œ Mutual Decentralized Synchronization for Iltitervehicle Communications.â€ IEEE Transactions on Vehicular Technology, Vol. 48, No. 6, pp. 2015-2027, 1999

[9] D. Lucarelli and I-J Wang, â€œ Decentralized Synchronization Protocols with Nearest Neighbor Communication, â€ in Proceedings of ACM SenSys 2004, 2004

[10] Y.-W. Hong, and A. Scaglione, "A Scalable Synchronization Protocol for Large Scale Sensor Networks and Its Applications," IEEE Journal on Selected Areas in Comm., Vol. 23, No. 5, pp. 1085-1099, 2005

[11] O. Simeone, U. Spagnolini, G, Scutari, and Y, Bar-Ness, "Physical-layer Distributed Synchronization in Wireless Networks and Applications," Physical Communication, pp. 67-83, 2008

[12] K.G. Va voudakis, F.L. Lewis, and G.R. Hudas, "Multi-Agent Differential Graphical Games: Online Adaptive Learning Solution for Synchronization with Optimality," Automatica, Vol. 48, No. 8, pp. 1598-1611, 2012

[13] M. Abouheaf, K. Vamvoudakis, F.L. Lewis, S. Haesaert, and R. Babuska, "Multi-Agent Discrete-Time Graphical Games and Reinforcement Learning Solutions," Automatica, Vol. 50, no. 12, pp. 3038-3053, 2014

[14] M. Pachter and K. Pham, "Discrete-Time Linear-Quadratic Dynamic Games," Journal of Optimization Theory and Applications, Edited by A. Miele, Vol. 146, No. 1, pp. 151-179, 2010

By virtue of the foregoing disclosure, it should be appreciated with the present innovation relates to radio controlled timing metrology, methods of performing distributed time synchronization and correct-by-design yet risk-averse clock steering in the presence of timing faults and misinformation and a judicious network topology adaptation for carrying out such methods.

A radio controlled time metrology is consisted of a radio wireless communication network of a plurality of distributed pulse coupled discrete-time clocks supported by the corresponding distributed discrete-time phase lock loops using identical loop filters and different free-oscillation frequencies arising from random frequency offsets. Associated with the the distributed network with radio clocks is a reconfigurable topology being modelled as a sequence of weighted undirected graphs. Methods of iterative risk-averse clock steering, distributed time synchronization, and judicious topology adaptation such that: in nominal conditions, distributed radio clocks autonomously exchange timing pulse signals with each other, each of the clock self-directly performing timing sharing with risk-averse power control and reliably receiving of its neighboring timing signals; and in case of experiencing timing faults and misinformation spreads, time synchronization, clock steering and topology adaptation are protected by risk-averse decision making via pursuit-evasion game-theoretic optimization operations.

In one or more embodiments, the present innovation can be used and applied to a multitude of applications requiring time comparison with high precision and accuracy over large distances; e.g., distributed synchronization in wireless communications; universal time metrology with intercontinental links to connect major time keeping laboratories in North America, Europe and Japan; high precision and high accuracy time transfer and synchronization for robust positioning, navigation and timing.

According to aspects of the present disclosure, network topology of radio clocks is adapted to choose effective clock steering operations in the presence of persistent and competing timing faults and misinformation spreads. The present innovation also optimizes topology dynamisms in terms of power controls distributed among incumbent clocks as needed to achieve resilient time synchronization. As such, the synchronization of radio networks of clocks tackling both scalability and energy efficiency issues of stochastically synchronizing clocks is to embrace a distributed paradigm in which randomly selected clocks transmits its synchronizing signals in some periods while in others listen to the signals received by other clocks according to via Bernoulli distributions.

According to one of the embodiments of the invention, intricate interactions via clock pulse power transmissions among the clocks are observed and analyzed for positivity, monotonicity, and scalability, and thereby, leading to the framework for understanding of the convergence of common power controls. Also related to reweight the time synchronization network was the values of the signal-to-interference-plus-noise ratios (SINRs) for transmissions, which are then optimized to ensure acceptable connections in the presence of interferences caused by friendly neighboring clocks.

Another embodiment of the disclosure considers the event of sentient intruders, meaning that adversarial clocks could potentially inject false timing signals into the incumbent network of time transfers and synchronizations. Another object of the present invention is a method of investigating the susceptibility of the spread of misinformation about timing signals comprising the class of discrete-time linear-quadratic dynamic games. In particular, the expected payoff for distributed time synchronization network is employed as an effective measure for the cluster of the clocks to dynamically reweight the interaction topology, and thereby, reducing the effect of the false timing signals from ill-behaved clocks on the synchronization network.

An object of the present innovation is a radio controlled time metrology comprising: (i) a network of distributed clocks; (ii) a radio frequency communication network interconnecting the clocks; (iii) a plurality of discrete-time clocks composed of distributed discrete-time phase lock loops with the identical loop filters and different free-oscillation frequencies; and (iv) analog frontends and digital signal processing means to transmit and receive clock pulse signal powers. Characterized in that it further comprises control means for steering the clocks and network topology adjustment such that: in nominal conditions, a subset of radio clocks exchange timing data with neighboring clocks situated within the coverage area, each of the clock autonomously implementing its random transmit and receive selection, allocating its transmit powers for timing pulses based on interference average power control iterations, and assigning rest periods right after the pulsing of timing signals, and each of the clock contributing to local coupling and network topology adjustments when time differences to be scaled appropriately in accordance of channel qualities, and in the event of timing faults and/or misinformation spreads, clock steering operations are switched from interference average power control interactions to risk hedging and anticipative countermeasures for clock steering via the framework of pursuit-evasion graphical games for worst-case distributed time synchronization.

Yet another object of the innovation is unique to resilient time svnchronizatian under adversarial encounter interactions caused by ill-behaved clocks comprising: (i) proper power controls for the weights on the edges of the network governed by evasion policies for clock steering operations with complete state feedback observations could help well-intent clocks maintaining residual timing errors below a given level while making the tracking errors observed by ill-behaved clocks large and forcing them to expend more energy; (ii) the exploitation of the prior knowledge of environmental disturbances, from which the sample realizations of clock phase noises are taken into account for resilient consensus and persistent spread of misinformation; and (iii) the value funs ion provided the best possible performance to the malicious docks; that is, as long as they keep their optimal play. Otherwise, the actually realized payoff would be better off for the incumbent clocks.

An exemplary radio network of coupled discrete-tithe oscillators corrupted by phase noises together with the operational assumption that these the clocks are able to communicate with other nearby clocks. Mean-square stabilization and time-varying graph theoretic constructs are feasible to facilitate the stability analysis of clusters of incumbent and/or ill-behaved clocks.

The different embodiments of the innovation carefully design clock steering operations supported by interference averaging powe iterations from the physical layer perspective for learningwl adaptation to maintain appropriate qualities of conrrxrunication link closure for distributed time transfers and to establish reliable grounds for mutual time synchronization in cases of effectively compensating and/or countering potential misbehaving clocks. The functional block diagram of adversarial encounters of timing misinformation spreads according to the invention, showing in particular the application of the theory of dynamic games to resilient synchronization of well-intent clocks in the presence of misbehaving timing transfers. Both tractable analysis and competitive engagements are motivated by the widespread of information available across well-intent and misbehaving clock clusters and more explicitly, both opposing teams are aware of the dynamic parameters of the discrete-time linear-quadratic dynamic game, and thus influencing time synchronization errors and convergent rates. Resilient clock steering policies for well-intent clocks are anticipative and risk hedging that are enabled by self-enforcing equilibrium decision strategies and resulted from the dynamic game and thus, no need to wait for misinformation spreads happening first.

Mass production of small earth stations; e.g., the so-called very small aperture terminals (VSAT's) and direct broadcast satellites employing higher frequencies (Ku-and Ka-bands rather than C-band) and more directional satellite antennas (spot beams) are best suited for timing measurements of high precision and accuracy. It is now feasible for time keeping institutions to set up dedicated low-cost on-site earth stations with receive and- transmit capability without reliance on the stringent requirement of colocation.

Other uses for the invention are near real-time command control of global navigation satellite systems (GNSS), enabling agile support of the warfighter tot include the abilities to correct misleading information on positioning, navigation and timing; rekey specific crypto nets; and leverage multi-input multi-output antenna characteristics and radio/optical transceiver systems. Resilient time synchronization will therefore enable multi-GNSS constellations to be controlled from one ground antenna and thus, eliminating the need for overseas stations.

Additional information is provided in APPENDIX-A, attached hereto, the contents of which are hereby incorporated by reference in its entirety.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the ebodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A radio controlled time metrology comprising:
   a network of distributed clocks;
   a radio frequency communication network interconnecting the clocks;
   a plurality of discrete-time clocks composed of distributed discrete-time phase lock loops with identical loop filters and different free-oscillation frequencies;
   analog frontends and digital signal processing means to transmit and receive clock pulse signal powers;
   a controller for steering the clocks and network topology adjustment such that:
      a subset of radio clocks exchange timing data with neighboring clocks situated within the coverage area, each of the clock autonomously implementing its random transmit and receive selection, allocating its transmit powers for timing pulses based on interference average power control iterations, and
      assigning rest periods right after the pulsing of timing signals, and each of the clock contributing to local coupling and network topology adjustments when time differences to be scaled appropriately in accordance of channel qualities, and
      in the event of timing faults and/or misinformation spreads, clock steering operations are switched from interference average power control interactions to risk hedging and anticipative countermeasures for clock steering via the framework of pursuit-evasion graphical games for worst-case distributed time synchronization.

* * * * *